United States Patent
Leclercq et al.

(10) Patent No.: US 8,843,111 B2
(45) Date of Patent: Sep. 23, 2014

(54) METHODS AND DEVICES FOR THE TRANSMISSION AND RECEPTION OF A MESSAGE TO BE EXCHANGED BETWEEN AN AIRCRAFT AND A GROUND BASE, AND AIRCRAFT PROVIDED WITH SUCH DEVICES

(75) Inventors: Agnes Leclercq, Toulouse (FR); Cecile Colle-Morlec, Labarthe sur Leze (FR)

(73) Assignee: Airbus Operations S.A.S., Toulouse (FR)

( * ) Notice: Subject to any disclaimer, the term of this patent is extended or adjusted under 35 U.S.C. 154(b) by 630 days.

(21) Appl. No.: 12/281,712

(22) PCT Filed: Mar. 7, 2007

(86) PCT No.: PCT/FR2007/000409
§ 371 (c)(1),
(2), (4) Date: Sep. 4, 2008

(87) PCT Pub. No.: WO2007/101945
PCT Pub. Date: Sep. 13, 2007

(65) Prior Publication Data
US 2009/0052370 A1    Feb. 26, 2009

(30) Foreign Application Priority Data
Mar. 8, 2006 (FR) ..................... 0650804

(51) Int. Cl.
| H04M 1/66 | (2006.01) |
| H04M 1/68 | (2006.01) |
| H04M 3/16 | (2006.01) |
| H04L 29/06 | (2006.01) |
| H04B 7/185 | (2006.01) |
| H04L 29/08 | (2006.01) |

(52) U.S. Cl.
CPC ............. *H04L 63/0227* (2013.01); *H04L 67/12* (2013.01); *H04L 63/20* (2013.01); *H04L 69/18* (2013.01); *H04L 63/104* (2013.01); *H04B 7/18508* (2013.01)
USPC ........... 455/411; 455/418; 455/466; 455/410; 455/3.02; 370/328; 370/338; 726/3; 726/22; 726/17

(58) Field of Classification Search
USPC ........ 455/431, 3.02, 410–411, 418–420, 466; 370/328–338; 726/1, 3, 17, 22; 713/168, 170, 161, 166
See application file for complete search history.

(56) References Cited

U.S. PATENT DOCUMENTS

| 5,602,916 A | * | 2/1997 | Grube et al. | .................. 380/270 |
| 6,677,888 B2 | | 1/2004 | Roy | |

(Continued)

FOREIGN PATENT DOCUMENTS

| JP | 2003-531539 | 10/2003 |
| JP | 2005-513871 | 5/2005 |

OTHER PUBLICATIONS

Green Book, "The Application of CCSDS Protocols to Secure Systems", Report Concerning Space Data System Standards, The Consultative Committee for Space Data Systems, CCSDS 350.0-G-2, Jan. 2006, 7 pages.

(Continued)

*Primary Examiner* — Quan M Hua
(74) *Attorney, Agent, or Firm* — Oblon, Spivak, McClelland, Maier & Neustadt, L.L.P.

(57) ABSTRACT

A method for emitting a message relating to a determined type of information to be exchanged between an aircraft and a ground base reception method, and corresponding devices. The method determines a level of a securement associated with the determined type by a correspondence table, and emits the message according to a protocol having the determined level of securement.

16 Claims, 3 Drawing Sheets

(56) References Cited

U.S. PATENT DOCUMENTS

| | | | |
|---|---|---|---|
| 7,607,006 B2* | 10/2009 | Ahuja et al. | 713/151 |
| 2002/0032853 A1 | 3/2002 | Preston et al. | |
| 2002/0138625 A1* | 9/2002 | Bruner et al. | 709/227 |
| 2003/0027550 A1* | 2/2003 | Rockwell | 455/410 |
| 2003/0068044 A1* | 4/2003 | Nikolsky | 380/258 |
| 2003/0119484 A1* | 6/2003 | Adachi et al. | 455/411 |
| 2003/0158963 A1 | 8/2003 | Sturdy et al. | |
| 2005/0081032 A1 | 4/2005 | Struik | |
| 2005/0286452 A1* | 12/2005 | Hardgrave et al. | 370/310 |

OTHER PUBLICATIONS

"Draft 03 (Strawman) of AEEC Project Paper 823. Datalink Security, Part 3—ACARS Message Security", Aeronautical Radio, Inc., XP002407258, (2006) Retrieved from the Internet: URL:http://www.arinc.com/aeec/projects/dse/cdsec_handouts_march06.pdf> [retrieved on Nov. 8, 2005.

Wargo C A et al., "Security Considerations for the e-Enabled Aircraft", IEEE Aerospace Paper, vol. 4-1533, XP010660380, pp. 41533-41550, (2003).

U.S. Appl. No. 12/297,219, filed Oct. 15, 2008, Leclercq, et al.

Combined Chinese Office Action and Search Report issued Jun. 5, 2013 in Patent Application No. 200780007962.8 with English Translation.

Office Action issued on Jun. 28, 2011 in Japanese Patent Application No. 2008-557798.

* cited by examiner

| AOC₁ | 0 |
|------|---|
| AOC₂ | 1 |
| AOC₃ | 2 |
| AOC₄ | 1 |
| ⋮ | |

| ATC₁ | 1 |
|------|---|
| ATC₂ | 1 |
| AOC₁ | 0 |
| AOC₃ | 1 |
| AOC₄ | 1 |
| ⋮ | |

METHODS AND DEVICES FOR THE TRANSMISSION AND RECEPTION OF A MESSAGE TO BE EXCHANGED BETWEEN AN AIRCRAFT AND A GROUND BASE, AND AIRCRAFT PROVIDED WITH SUCH DEVICES

The invention relates to the exchange of messages between an aircraft and a ground base. In particular, the invention is aimed at methods and devices for emission and reception of a message to be exchanged between an aircraft and a ground base, and an aircraft equipped with such devices.

It already has been proposed that data constituting messages be exchanged between an aircraft and a ground base, for example according to the ACARS protocol (for "Aircraft Communications Addressing and Reporting System") or the ATN protocol (for "Aeronautical Telecommunication Network").

In this context, attempts have been made to ensure secure exchanges between the aircraft and the ground base in the cases in which the exchanged information items were particularly sensitive, such as in the case of use of the aforesaid protocols for exchange of messages between the aircraft and air traffic control (for security purposes) and/or for exchange of messages between the aircraft and the airline company (for reasons of confidentiality of commercial information items). A system that permits secure exchanges is described, for example, in US Patent Application 2003/0030581.

Nevertheless, security of exchanges involves an increase in complexity of the protocols used (for example, because of the necessity of exchanging cryptographic keys in order to use a secure link), which in turn involves higher implementation costs for secure communications. Such an additional cost is passed on by the telecommunications service providers to the airline companies, which consequently would wish to limit the dependence on such secure exchanges to the extent possible.

Nevertheless, it is problematic for the emitter of the message to choose a particular level of security for such a message, since the message receiver cannot validly consider a message received regardless of its security level, at the risk, for example, of accepting as valid a message received without security (and therefore without proof of origin), whereas for the emitter it should have been a matter of a secure message.

In order to respond to these problems, the invention proposes a method for emission of a message relating to a determined type of information items to be exchanged between an aircraft and a ground base, characterized by the following steps:
  determination of a level of security associated with the determined type by means of a correspondence table;
  emission of the message according to a protocol having the determined level of security.

Thus the level of security used can be determined for each type of information items in flexible but organized manner by means of the correspondence table.

According to the same concept, the invention proposes a method for reception of a message relating to a determined type of information items to be exchanged between an aircraft and a ground base, characterized by the following steps:
  reception of the message according to a protocol having a first level of security;
  determination of a second level of security associated with the type determined in a correspondence table;
  comparison of the first level of security and the second level of security;
  acceptance or rejection of the message according to the result of the comparison step.

In this way it is verified upon reception that the exchange of data (message) indeed has taken place with a level of security compatible with the level provided in the table (for example, equal thereto).

The correspondence table is, for example, stored in memory in an electronic storage device of the apparatus in question (emitter or receiver).

It is possible to provide (for both reception and emission) a preliminary step of reception of the correspondence table by means of a communication between the aircraft and the ground base, thus permitting, between the aircraft and the ground base, very good coherence of the information items relating to the levels of security.

It is also possible to provide (generally from the side that emits the table) a step of generation of the correspondence table on the basis of a table of data that associates a desired level of security with at least one type of message.

According to one conceivable embodiment, this table of data can be received by means of a communication between the aircraft and the ground base, thus making it possible to use updated wishes as regards the levels of security to be used for certain types of message (for example, those managed by the airline company that emits the wishes).

It is possible in practice to provide that the generation step comprises, for at least one type of message, the association of a level of security with this type of message in the correspondence table as a function of the desired level of security associated with this message in the table of data and characteristics of the communication system being used, thus making it possible to take into account both the aforesaid wishes and the characteristics specific to each apparatus.

The invention also proposes a device for emission of a message relating to a determined type of information items to be exchanged between an aircraft and a ground base, characterized by means for determination of a level of security associated with the determined type by means of a correspondence table and means for emission of the message according to a protocol having the determined level of security.

The invention additionally proposes a device for reception of a message relating to a determined type of information items to be exchanged between an aircraft and a ground base, characterized by means for reception of the message according to a protocol having a first level of security, means for determination of a second level of security associated with the determined type in a correspondence table, means for comparison of the first level of security and the second level of security, and means, connected to the comparison means, for a decision as to acceptance or rejection of the message.

These devices may exhibit optional characteristics corresponding to those mentioned in the foregoing for the emission and reception methods.

These devices are, for example, used in the aircraft in question.

Other characteristics and advantages of the invention will become apparent in the light of the attached drawings, wherein:

FIG. 1 represents the general context of the invention;

FIG. 1 represents the general context in which the invention is implemented.

A ground base B communicates with an aircraft A by means of a link that permits exchange of data in digital form (or in other words according to the English term "data link") and that involves in particular a ground-to-air link $C_A$.

The link between ground base B and aircraft A may additionally involve other devices and links. For example, in the example presented in FIG. 1, ground base B communicates with a relay R (also situated on ground T) by means of a land communication network $C_T$; relay R transmits the information items intended for and originating from aircraft A by way of a satellite S.

It is noted that the use of a relay R is relatively common, because information items exchanged between ground base B and aircraft A are traditionally routed through relay R and satellite S under the responsibility of a service provider.

Alternatively, it could be provided that the information items are exchanged directly between aircraft A and ground base B.

Furthermore, it could be provided that HF or VHF radio communications are used instead of communication by satellite.

Figure 2:
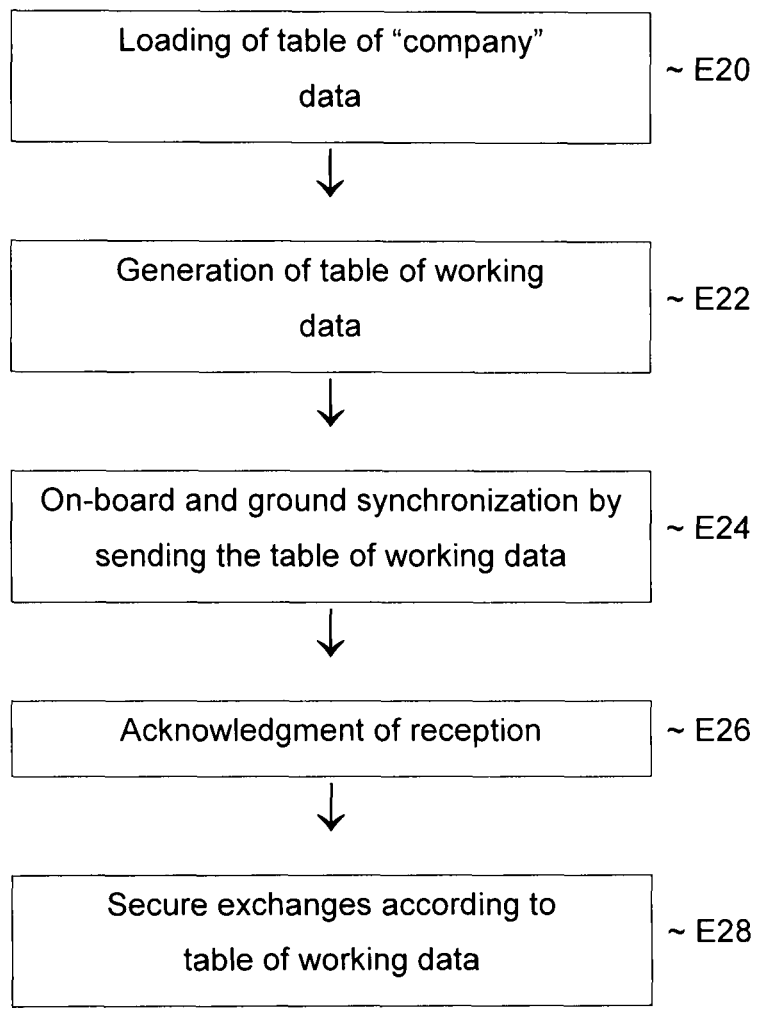
FIG. 2 represents a method for generation and use of a table in conformity with the teachings of the invention.

FIG. 2 represents an example of implementation of the invention within an aircraft.

According to this example, there is loaded, during a step E20, a table of "company" data (or set of "Airline" data), which defines, for each type of message to be exchanged between the aircraft and the devices or members of the airline company, the level of security that the airline company wishes to use for this type of message.

In the examples given hereinafter, there will be described, for the sake of simplification, an apparatus that uses two levels of security, namely, for example, the use of an unsecure communication protocol or the use of a secure communication protocol. There also will be mentioned (see FIG. 3, for example), and there could be envisioned in practice, a larger number of levels of security by virtue of the use of different protocols for secure communication, distinguished from one another by, for example, the cryptographic algorithms used therein or the length of the cryptographic keys implemented.

By loading of the table of data in step E20 there is understood the storage of this table of data by a memory device of the aircraft. Such loading can be effected on the ground, for example periodically during maintenance inspections of the aircraft, or more regularly, for example before each takeoff.

According to a conceivable variant, the loading provided in step E20 may be replaced by a step of reception, from the ground base, of the table of "company" data in the aircraft (which is equivalent to downloading of this table of "company" data) prior to any exchange of message that may be secure and additionally prior to generation of the table of working data envisioned in step E22 and described hereinafter.

Figures 3, 4:
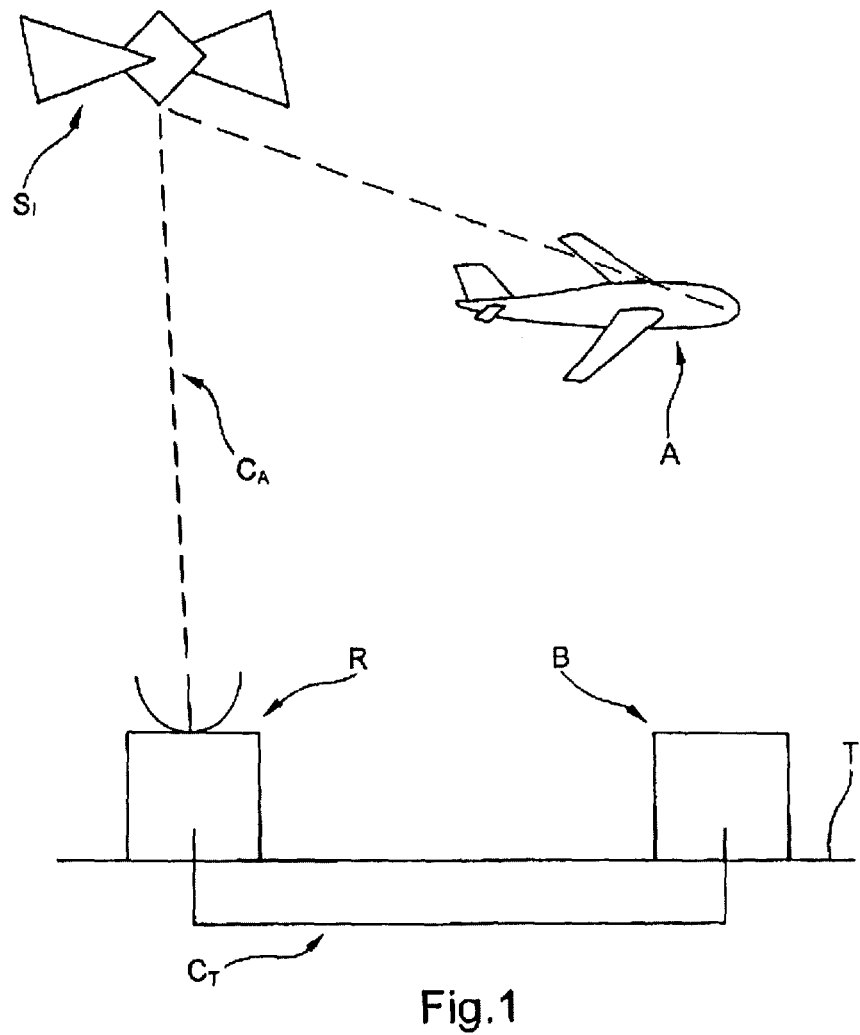
FIG. 3 represents an example of a table of "company" data such as used by the method of FIG. 2.
FIG. 4 represents an example of a table of working data such as used by the method of FIG. 2.

As already indicated, the table of "company" data defines the level of security desired by the company for at least part of the types of message proprietary thereto (including messages denoted AOC for "Airline Operational Control): for each type of message $AOC_1$, $AOC_2$, $AOC_3$ $AOC_4$ (traditionally designated by an index and a sub-index—commonly denoted "label" and "sub-label"), the table of "company" data gives the desired level of security, as illustrated in FIG. 3.

It is noted that, since the table of "company" data is not used directly for communications, as indicated hereinafter, it may on the one hand be common to different types of aircraft (the adaptation to each aircraft being undertaken in step E22, described hereinafter) and it does not necessarily have the level of certification required for the data on which the routers of the communication devices operate.

In effect, the router of the aircraft uses a table of working data generated in the course of a step E22 based on the table of "company" data and on other information items present in the aircraft, an example being the list of types of messages processed by the communication device of the aircraft and the levels of security that this device is able to implement.

Thus, for each type of message (identified as in the foregoing by an index and a sub-index), the level of security to be used for messages of this type is determined by using the table of "company" data, provided the type of message in question is present therein, and this information item is stored in memory within the table of working data, which therefore constitutes a table of correspondence between the type of message and the level of security to be adopted for the exchange of messages of this type.

The conceivable types of message can generally be classified into two main sets: the messages relating to air control or ATC (for "Air Traffic Control") and the messages under the responsibility of the airline companies, as already mentioned and denoted AOC.

It is proposed here that the following procedure be used to attribute a level of security to the different conceivable types of message:

if the type of message (identified by its index and its sub-index, or "label" and "sub-label") concerns ATC messages, then the default level of security for ATC messages (corresponding, for example, to a secure protocol) is associated with this type of message (in other words, for example, with the index and with the sub-index) in the table of working data;

if the type of message corresponds to AOC messages, the table of "company" data is searched to find whether a desired level of security is defined for this type of message, and a determination is additionally made as to whether this desired level of security can be implemented by means of the communication device of the aircraft.

In the case of AOC messages, if the table of "company" data gives, for a particular type of message, a level of security that can be implemented in the communication device of the aircraft, this level of security in regard to the type of message in question (or in other words to the index and sub-index designating this type of message) is written into the table of working data.

If, on the contrary, the type of message in question does not appear in the table of "company" data, or if the level of security desired according to this table of "company" data cannot be implemented by the communication device of the aircraft, a default level of security is associated with this type of message in the table of working data.

Moreover, the solution envisioned here could make it possible to store only the types of message associated with a level of security other than the default level in the table of "company" data.

Returning to the example of tables of "company" data in FIG. 3, the table of working data illustrated in FIG. 4 would be obtained in an aircraft that uses only the information items $AOC_1$, $AOC_3$ and $AOC_4$ and whose communication device is able to implement only levels of security 0 and 1.

In this table of working data illustrated in FIG. 4, level of security 1 has therefore been attributed by default to messages $ATC_1$ and $ATC_2$. Furthermore, levels of security (respectively 0 and 1) conforming with the table of "company" data have been associated with the messages of type $AOC_1$ and $AOC_4$, since these levels of security were defined in this table and can be implemented by the communication device of the aircraft. Finally, the level of security 1 has been attributed by default to the messages of type $AOC_3$, since the communication device of the aircraft does not make it possible to implement the level of security 2 defined as the desired level of security in the table of "company" data.

According to the first embodiment envisioned here, the table of working data, intended for the ground base, is then emitted in a step E24, before any potentially secure exchange.

This transmission of the table of working data permits the communication device of the ground base to know the level of security adopted by the aircraft for each type of message, which will make it possible to ensure coherent exchanges between the aircraft and the ground base, as described hereinafter.

When the communication devices of the ground base have received the table of working data and stored it in memory, these devices indicate receipt of this table by emitting an acknowledgment, whose reception by the aircraft (in the course of a step E26) conditions the start of exchanges, which may be secure, in a step E28.

Figure 5:
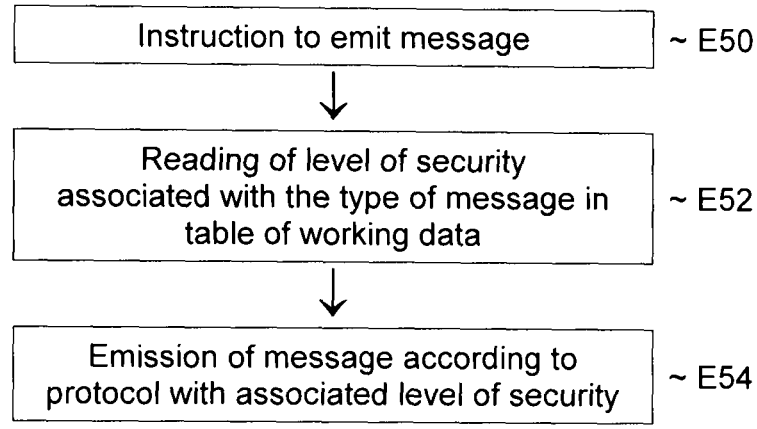
FIG. 5 represents the emission of a message with use of the table provided by the invention.

During the exchange of an information item (or message) between the aircraft and the ground base following an emission instruction (step E50 in FIG. 5), the emitter device (whether it is the communication device of the aircraft or the communication device of the ground base) looks up (step E52) the table of working data, common to the two devices by virtue of the exchange of this table in the already described step E24, and determines the level of security to be applied to the message to be sent as a function of the type of message.

In the example given in FIG. 4, when emission of a message of type $AOC_3$ is required by one of the communication devices, it is evident by reading the table of data that the message must be sent with level of security 1.

The emitter device then implements emission of the message to be sent by means of a communication protocol having the required level of security, as represented in step E54.

It is noted that a conceivable variant could be to store, in the table of working data, only the types of message associated with a level of security different from a default level (which would reduce the size of this table). During emission, messages without correspondence in the table would be emitted with this default level.

It will be noted that the receiver device (whether it is the communication device of the ground base or the communication device of the aircraft) knows the level of security associated with the information item that it is receiving, because it also contains the table of working data in memory.

This knowledge of the level of security of the received message makes it possible not only to facilitate processing of the received message according to the appropriate protocol (which moreover could be achieved by other methods, such as inclusion, in the message, of a header defining its level of security), but also to take the message into account only if it is transmitted by a protocol having the level of security associated with messages of this type in the table of working data.

In this way, for example, it is possible to reject messages received by means of a protocol having a level of security different from that provided in the table of working data.

Figure 6:
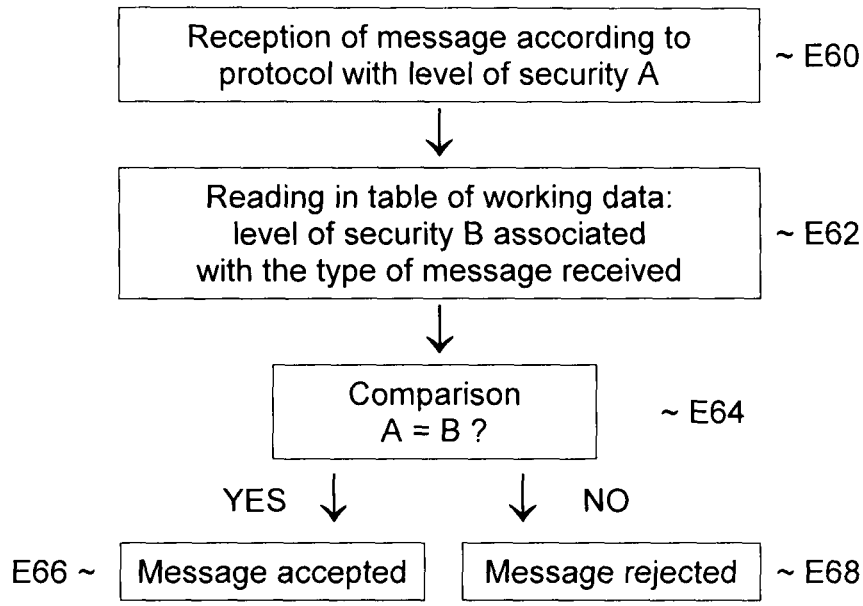
FIG. 6 represents the reception of a message with use of the table provided by the invention.

This is achieved, for example, by proceeding to the following steps on the reception side, as indicated in FIG. 7:

the message is received according to a protocol having a certain level of security (step E60 in FIG. 6);

the level of security provided for the messages of the type of the received message is read in the table of working data (step E62);

the level of security of the protocol used for reception is compared with the provided level of security (step E64);

the message is accepted (step E66) only in the case of equality to the preceding step, and otherwise the message is refused (step E66).

Alternatively, it would be possible to reject only the messages whose level of security is lower than that indicated in the table of working data.

According to a conceivable variant of the embodiment just presented, it would be possible to eliminate the step of exchange of the table of working data (step E24 hereinabove), then necessitating the prior presence of the table of working data within each entity capable of communicating with the aircraft, for example by broadcasting this table (which necessitates storage of at least one table per type of aircraft) or by generating the table in each entity according to a process of the type described with reference to step E22 (which involves knowledge of the characteristics of the different types of aircraft within each entity).

The example and the variants just described constitute only one possible mode of use of the invention.

The invention claimed is:

1. A method for sending a message associated with a determined type of information item to be exchanged between an aircraft and a ground base, the method comprising:

receiving a table of data that associates a desired level of security with at least one type of message;

generating a correspondence table based on the table of data;

sending the correspondence table;

determining a level of security to be applied to the message based on the determined type of information item associated with the message, the determined type of information item associated with the message and a corresponding determined level of security being defined in the correspondence table;

sending the message according to a protocol having the determined level of security;

establishing a wireless connection between the ground base and the aircraft via which the table of data is received, by the aircraft, from the ground base;

associating the level of security with the determined type of information item associated with the message as a function of the desired level of security associated with the determined type of information item associated with the message and characteristics of a communication system of the aircraft and the ground base being used; and recording said associating in the correspondence table.

2. The method according to claim 1, wherein the correspondence table is stored in a memory in an electronic storage device of the aircraft.

3. The method according to claim 1, further comprising receiving, at the ground base, the correspondence table from the aircraft.

4. The method according to claim 1, wherein the correspondence table is generated at the aircraft based on the table of data that associates the desired level of security with the at least one type of message.

5. A method for receiving a message associated with a determined type of information item to be exchanged between an aircraft and a ground base, the method comprising:

receiving a table of data that associates a desired level of security with at least one type of message;

generating a correspondence table based on the table of data;

sending the correspondence table;

receiving the message according to a protocol having a first level of security determined based on the determined type of information item associated with the message;

determining a security level associated with the determined type of information item associated with the message, the determined type of information item associated with the message and a corresponding determined security level being defined in the correspondence table;

comparing the first level of security to the determined security level associated with the determined type of information item associated with the message defined in the correspondence table;

accepting or rejecting the message based on a result of the comparison, establishing a wireless connection between the ground base and the aircraft via which the table of data is received, by the aircraft, from the ground base;

associating the security level with the determined type of information item associated with the message as a function of the desired level of security associated with the determined type of information item associated with the message and characteristics of a communication system of the aircraft and the ground base being used; and recording said associating in the correspondence table.

6. A device for sending a message associated with a determined type of information item to be exchanged between an aircraft and a ground base, the device comprising:

means for receiving a table of data that associates a desired level of security with at least one type of message;

means for generating a correspondence table based on the table of data;

means for sending the correspondence table;

means for determining a level of security to be applied to the message based on the determined type of information item associated with the message, the determined type of information item associated with the message and a corresponding determined level of security being defined in the correspondence table;

means for sending the message according to a protocol having the determined level of security;

means for establishing a wireless connection between the ground base and the aircraft via which the table of data is received, by the aircraft, from the ground base;

means for associating the security level with the determined type of information item associated with the message as a function of the desired level of security associated with the determined type of information item associated with the message and characteristics of a communication system of the aircraft and the ground base being used; and means for recording said associating in the correspondence table.

7. The device according to claim 6, wherein the correspondence table is stored in memory in an electronic storage device of the aircraft.

8. The device according to claim 6, further comprising means for receiving, at the ground base, the correspondence table from the aircraft.

9. The device according to claim 6, wherein the correspondence table is generated at the aircraft based on the table of data that associates the desired level of security with the at least one type of message.

10. A device for receiving a message associated with a determined type of information item to be exchanged between an aircraft and a ground base, the device comprising:

means for receiving a table of data that associates a desired level of security with at least one type of message;

means for generating a correspondence table based on the table of data;

means for sending the correspondence table;

means for receiving the message according to a protocol having a first level of security determined based on the type of information item associated with the message;

means for determining a security level associated with the determined type of information item associated with the message, the determined type of information item associated with the message and a corresponding determined security level being defined in the correspondence table;

means for comparing the first level of security and the determined security level associated with the type of information item associated with the message defined in the correspondence table;

means for deciding acceptance or rejection of the message;

means for establishing a wireless connection between the ground base and the aircraft via which the table of data is received, by the aircraft, from the ground base;

means for associating the security level with the determined type of information item associated with the message as a function of the desired level of security associated with the determined type of information item associated with the message and characteristics of a communication system of the aircraft and the ground base being used; and means for recording said associating in the correspondence table.

11. An aircraft, comprising a device for sending a message associated with a determined type of information item to be exchanged between the aircraft and a ground base, the device comprising:

means for receiving a table of data that associates a desired level of security with at least one type of message;

means for generating a correspondence table based on the table of data;

means for sending the correspondence table;

means for determining a level of security to be applied to the message based on the determined type of information item associated with the message, the determined type of information item associated with the message and a corresponding determined level of security being defined in the correspondence table;

means for sending the message according to a protocol having the determined level of security;

means for establishing a wireless connection between the ground base and the aircraft via which the table of data is received, by the aircraft, from the ground base;

means for associating the security level with the determined type of information item associated with the message as a function of the desired level of security associated with the determined type of information item associated with the message and characteristics of a communication system of the aircraft and the ground base being used; and means for recording said associating in the correspondence table.

12. The method according to claim 1, wherein the determined type of information item is one of air traffic control and airline operational control.

13. The method according to claim 1, wherein the characteristics of the communication system of the aircraft and the ground base include levels of security that the aircraft and the ground base are able to implement.

14. The method according to claim 1, wherein a default security level is applied to the determined type of information item associated with the message when the corresponding determined level of security for the determined type of information item associated with the message is not defined in the correspondence table.

15. The method according to claim 1, wherein a default security level is applied to the determined type of information item associated with the message when the corresponding determined level of security for the determined type of information item associated with the message cannot be implemented by a communication device of the aircraft.

16. The method according to claim 1, further comprising commonly storing the correspondence table in the aircraft and the ground base prior to said determining the security level to be applied to the message.

* * * * *